United States Patent [19]

Takahashi et al.

[11] 4,178,613
[45] Dec. 11, 1979

[54] TELEVISION PICTURE SPECIAL EFFECTS SYSTEM USING DIGITAL MEMORY TECHNIQUES

[75] Inventors: Ryosuke Takahashi; Masao Inaba; Masashi Onosato, all of Tokyo, Japan

[73] Assignee: Nippon Electric Co., Ltd., Tokyo, Japan

[21] Appl. No.: 839,212

[22] Filed: Oct. 4, 1977

[30] Foreign Application Priority Data

Oct. 5, 1976 [JP] Japan .............................. 51-119950

[51] Int. Cl.² ...................... H04N 9/535; H04N 5/22; H04N 5/76
[52] U.S. Cl. ...................................... 358/183; 358/22; 358/127; 360/33

[58] Field of Search ................ 358/127, 93, 148, 160, 358/183, 22, 8, 222, 104, 181; 360/32, 33, 36; 315/371; 365/118; 340/723–725, 734–791

[56] References Cited

U.S. PATENT DOCUMENTS

| Re. 28021 | 5/1974 | Boxman et al. | 358/22 |
| 3,958,232 | 5/1976 | Hobrough et al. | 358/183 |

Primary Examiner—John C. Martin
Attorney, Agent, or Firm—Hopgood, Calimafde, Kalil, Blaustein & Lieberman

[57] ABSTRACT

A television special effects system which stores a video signal, divides the stored video signal into portions and displays the portions of the video signal, shifted apart from each other, on the television screen.

11 Claims, 9 Drawing Figures

TELEVISION PICTURE SPECIAL EFFECTS SYSTEM USING DIGITAL MEMORY TECHNIQUES

FIELD OF THE INVENTION

This invention relates to a television picture special effects system and more particularly to a video processing system designed to produce special effects on a picture displayed on a television screen, through the use of digital memory techniques.

BACKGROUND OF THE INVENTION

When it is desired to simultaneously display two video signals, A and B, on a single television screen, it has been common practice to extract, from the signals A and B, only those portions required and to display the desired portions on the same screen to form a single picture thereon. With this practice, if any desired portions of the two signals coincide, or lie in the same position in the picture frame, only one or the other of the two desired portions can be displayed on the screen. This situation can be rectified, if either of the two signals A and B are produced by a local television camera, by shifting the scene or subject being televised or by changing the camera angle or the position at which the camera is set. Alternatively, if both signals A and B are fixed signals, such as the ones from a video tape recorder, a film projection, a telop, or a fixed camera, either one of the two signals must be eliminated.

It is, therefore, an object of the present invention to provide a television picture special effects system which makes it possible to display any desired portion of a video signal in any desired position on the television screen without requiring an operation at the signal source.

SUMMARY OF THE INVENTION

According to the present invention there is provided a video processing system for producing special effects on a picture as displayed on a television screen which comprises; memory means for storing an input video signal, write-in address signal generator means for producing a write-in location signal which specifies an address in said memory means where the input video signal is to be written, read-out address signal generator means for producing a read-out location signal which specifies the address in said memory means where video information stored therein is to be read out, from and address control means for controlling at least one of said two, write-in and read-out address signals in accordance with an external control signal, so that the output video signal as read out from said memory means, is divided into signal portions which are shifted apart from each other in the picture frame with respect to a corresponding portion of the input video signal.

It is a feature of the present invention, that any desired portion of a video signal can be displayed on the television screen, in any desired position, without necessitating a particular operation at the source of the input video signal, due to the fact that the input video signal is divided into portions shifted apart from each other in the picture frame in accordance with an external control signal.

Other features and advantages of the present invention will be understood from the following detailed description of a preferred embodiment of the present invention in conjunction with the accompanying drawings.

DETAILED DESCRIPTION

Figure 1:
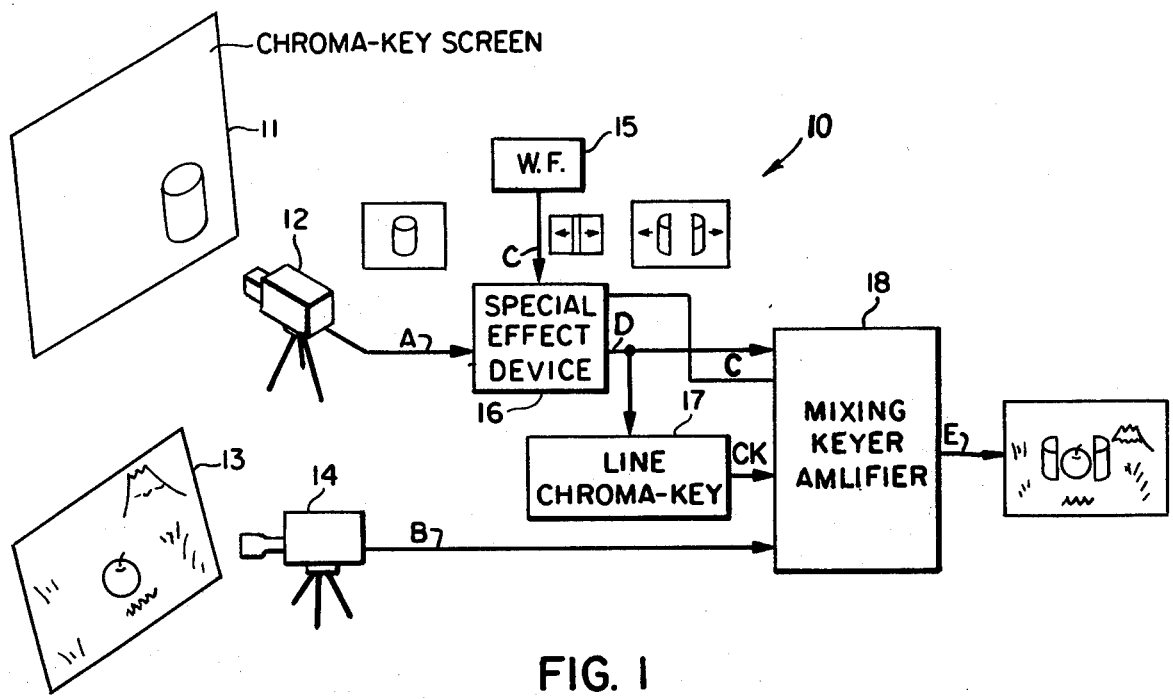
FIG. 1 is a schematic block diagram of a video mixing system according to a preferred embodiment of the present invention.

Referring to FIG. 1, a video mixing system 10 includes a picture special effects device 16 embodying the present invention. As shown, the system 10 comprises a television camera 12 which is used to take a picture displayed on a chroma-key screen 11 to produce a video signal. Another television camera 14 is used to take the picture on another screen 13 to produce a video signal B. A special effects signal generator 15 produces a special effects signal C, as an external control signal, to be fed to the special effects device 16, which in turn produces a video signal D as a split version of video signal A from camera 12 in accordance with the special effects signal C. A chroma-key signal generator 17 produces a chroma-key signal CK upon reception of the video signal D, from the special effects device 16, and a mixing keyer amplifier 18 receives, the video signals B, D and the chroma-key CK and the special effect signal C and in response thereto, produces a composite video signal E as a desired combination of video signals A and B.

The mixing and keyer amplifier 18 allows, in response to the chroma-key signal CK and the special effects signal C, the video signal B to pass therethrough when at least one of the signals CK and C are present, and the video signal D when neither CK and C are present.

Figure 2:
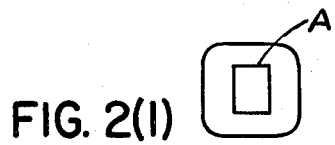
FIGS. 2(1), 2(2) and 2(3) diagrammatically illustrate several special effects obtainable on the television screen in accordance with the present invention.
Figure 2:
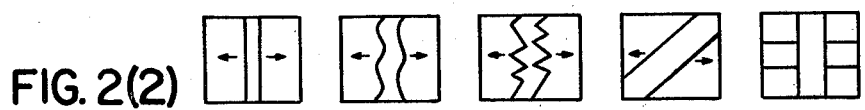
Figure 2:
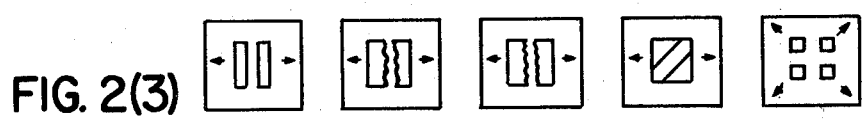

The special effects signal C, in the embodiment illustrated, can be a waveform signal, of the type indicated in FIG. 1 but may also take any of other forms illustrated in FIG. 2(2). In this case, where the input video signal A is as illustrated in FIG. 2(1), different forms of video signal D, as illustrated in FIG. 2(3) are obtainable through the special effects device 16. The obtained signals are a split version of the input video signal A, generated in accordance with the respective waveform signals of FIG. 2(2), which are employed as special effects signal C.

Figure 3:
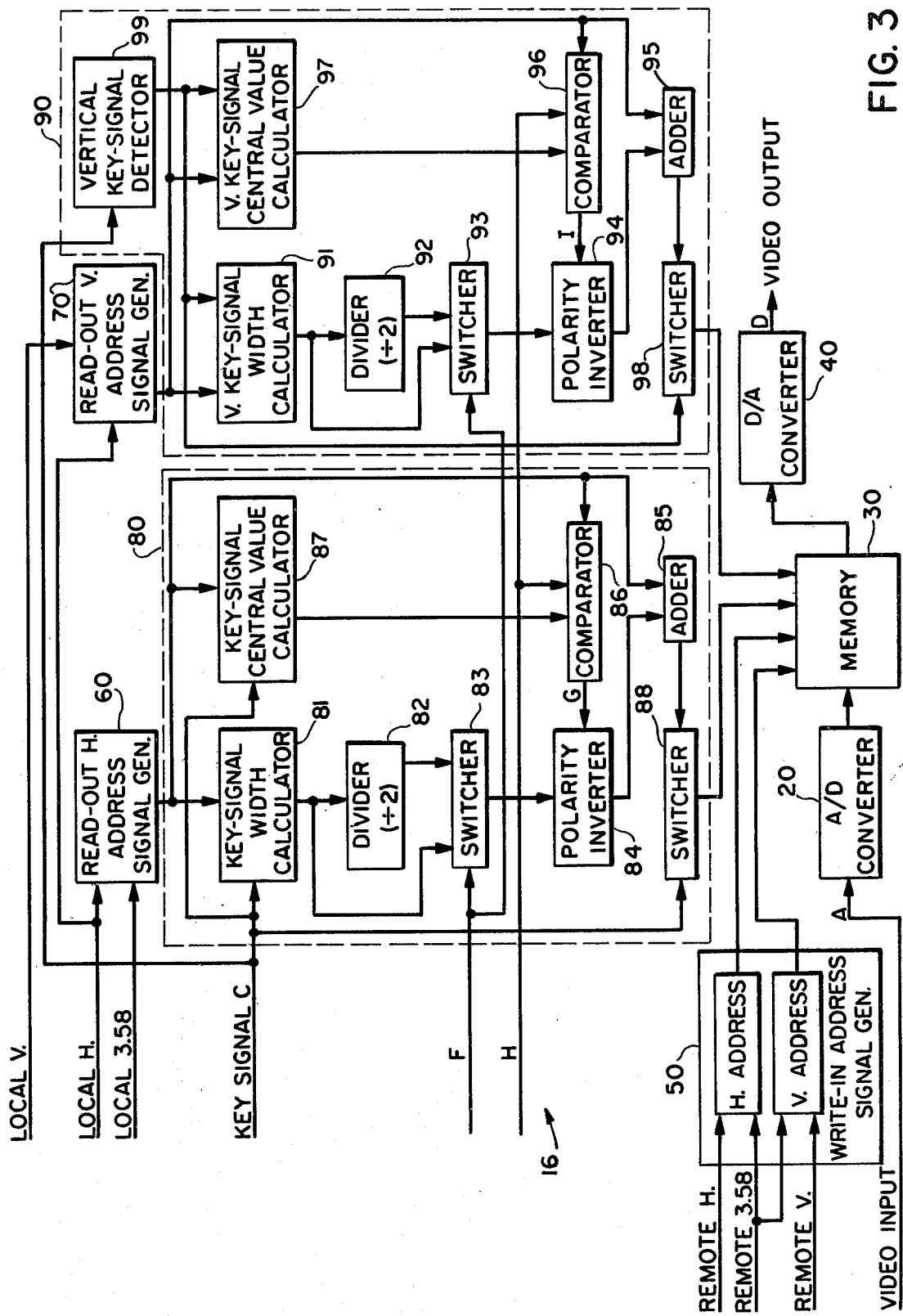
FIG. 3 is a block diagram of a special effects device used in the preferred embodiment shown in FIG. 1.

Refer now to FIG. 3 for a description of special effects device 16.

As illustrated, the device 16 includes an A-D converter 20 for converting the input video signal A to a digital video signal, a memory 30 for storing the digital video signal, a D-A converter for converting the digital video signal, read out from the memory 30, into a corresponding analog video signal D, a write-in address signal generator 50 for producing write-in address signals specifying the location in memory 30 at which the digital video signal is to be written in, a horizontal and a vertical read-out address signal generator 60 and 70 for producing a horizontal and a vertical read-out address signal, respectively, which specify the horizontal and vertical read-out address location in memory 30 at which video information stored therein is to be read out from, and horizontal and vertical read-out address controllers 80 and 90 for controlling, respectively, the horizontal and vertical read-out address signals in accordance with the special effects signal C.

In operation, the input video signal A is converted, at the A–D converter 20, into the digital video signal and, as such, is written into memory 30. Storage in memory 30 is under the control of write-in address signals, which are fed to the memory 30 from the write-in address signal generator 50. As indicated, the signal generator 50 is supplied with remote synchronizing signals, including a horizontal synchronizing signal, a vertical synchronizing signal and a subcarrier of 3.58 MHz, all of which are in synchronism with the input video signal A.

Alternatively, local read-out synchronizing signals which include a horizontal and a vertical sync signal and a subcarrier, are in synchronism with video signal B and are supplied to the horizontal and vertical read-out address signal generators 60 and 70. Generators 60 and 70 produce horizontal and vertical read-out address signals, respectively, in accordance with the local synchronizing signals. The read-out address signals are fed through the read-out address controllers 80 and 90, to the memory 30 whereby the read-out address location in the memory is controlled in response to the special effects signal C. Signal C is fed to the read-out address controllers 80 and 90 as an external control signal from the special effects signal generator 15 (FIG. 1). If no special effects signal C is fed to the read-out address controllers 80 and 90, the read-out address signals are fed to the memory 30 without being controlled in any manner by the address controllers 80 and 90. When this occurs the digital video signal stored in the memory 30 is read out in synchronism with the local synchronizing signals without being split in the picture frame. The read-out digital video signal is converted by the D-A converter into a corresponding analog video signal D. The operation of the device 16, without the read-out address controllers 80 and 90, is similar to that described in U.S. Pat. Nos. 3,909,839 and 4,007,486 entitled "Phase Locking System for Television Signals Using Digital Memory Techniques" and "Phase Locking System for Television Signals Using a Digital Memory Technique", respectively, both assigned to the assignee of the present invention.

Assume now that special effects signal C (referred to hereinafter as a key signal) is applied from the special effects signal generator 15 to a key signal width calculator circuit 81. Calculator circuit 81 forms part of the horizontal read-out address controller 80 and the calculator circuit detects the values of the key signal C, at its leading and trailing edges, in reference to the value of the horizontal address signal from the address signal generator 60. Calculator circuit 81, via the detection process, calculates the width of the horizontal key signal, for each period of horizontal scan, in subcarrier frequency units.

The full horizontal width signal from the calculator circuit 81, representing the width of the horizontal key signal, is fed directly to a value switching unit 83 and also to 82. Divider 82, a divider reduces the value of the width signal in half and produces a half horizontal width signal. The value switching unit 83 is supplied with a value switching signal F and, in response to this signal, the output signal of the switching unit is either of full or half horizontal width. More particularly the switching unit 83 is controlled by the switching signal F so as to output a half horizontal width signal where the picture on the television screen is to be split into portions which are shifted to the right and left, respectively. Alternatively, the switching unit 83, in response to signal F, can output a full horizontal width signal in the case where the picture is to be shifted laterally.

The selected horizontal width signal, from the value switching unit 83, is fed through a polarity inverter 84 to a horizontal address adder 85 so that the selected horizontal width signal can be added to the read-out horizontal address signal. The polarity inverter 84 outputs either the horizontal width signal intact or an inverted horizontal width signal representing the complement of the signal input to the inverter 84, in accordance with a polarity control signal G supplied from a value comparator 86.

The polarity control signal G is obtained in the following manner. Key signal C and the read-out horizontal address signal are fed to a key signal central value calculator 87 where the central value of the key signal C, in reference to a predetermined point in the horizontal scan period, is calculated in subcarrier frequency units for each period of horizontal scan. The calculator output signal, representing the central value of the horizontal key signal, is fed to the value comparator 86, to which is also applied the read-out horizontal address signal and a control signal H. The comparator 86 produces, in response to the control signal H, polarity control signal G each time the value of the read-out horizontal address signal coincides with that of the horizontal central value signal.

As long as no polarity control signal G is fed to the polarity inverter 84 and the horizontal width signal is passed therethrough intact to the horizontal address adder 85, i.e., until the read-out address signal coincides with the central signal, the picture displayed on the television screen is shifted to the left. In contrast, when polarity control signal G is fed to the polarity inverter, the inverted horizontal width signal output therefrom is added with the horizontal address signal i.e., the horizontal width signal is subtracted from the address signal, the picture displayed on the television screen is shifted to the right. The added address signal supplied from the adder 85 is supplied through a switcher 88 to the memory 30. The switcher 88 inhibits the transfer of the added address signal only when the key signal C is applied thereto, whereby the stored signal is not read out during the period of the key signal C.

Figure 4:
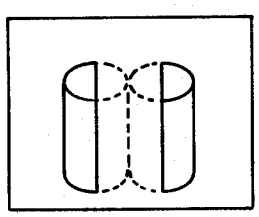
FIGS. 4(1)–4(4) show examples of the picture obtained by the special effects device shown in FIG. 3.
Figure 4:
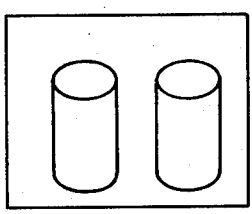
Figure 4:
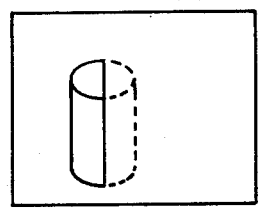
Figure 4:
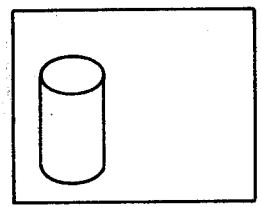

Thus the picture, displayed on the television screen, is shifted horizontally in opposite directions from the center of the key signal, as shown in FIGS. 4(1) and 4(2). In the case where the half width signal is selected by the switcher 83, the split picture shown in FIG. 4(1) is obtained. When the full width signal is selected, the shifted picture shown in FIG. 4(2) is obtained.

In the case where no control signal H is applied to the comparator 86, the signal G is not produced and the width signal selected by the switcher 83 is directly applied to the adder 85. Therefore, the pictures, as shown in FIGS. 4(3) and 4(4), are obtained in accordance with the half-and the full-width signals, respectively.

The foregoing has described the operations required to horizontally shift the picture as displayed on the television screen. In cases where picture shifting is desired only in the horizontal direction, the storage capacity of memory 30 need only be sufficient to cover two successive periods of horizontal scan. However, in order to vertically shift the picture on the television screen, the vertical read-out address controller 90 is operated and, in this case, the memory 30 must have a capacity sufficient to cover at least one field of scan. The vertical read-out address controller 90 functions in substantially the same manner as the horizontal read-out address controller 80 except for the period of operation. Namely, whereas the horizontal read-out address controller 80 operates periodically in conjunction with the period of the horizontal scan in subcarrier frequency units, the vertical read-out address controller 90 operates periodically in conjunction with the period of the field scan in units of the period of the horizontal scan. The following description will describe the vertical address controller 90 in detail.

A key signal vertical detector 99 is provided to indicate that the key signal C fed thereto is a vertical key signal only when the key signal C extends over the entire length of the period of horizontal scan. The vertical key signal is fed to a vertical width calculator 91 and a vertical central value calculator 97. The vertical width calculator 91, detects the value of the key signal at its leading and trailing edges and calculates the width of the vertical key signal for each period of vertical scan in units of the horizontal scan. The full vertical width signal, representing the width of the vertical key signal, i.e., its vertical width on the picture screen or frame, is fed directly to a value switching unit 93 and is also fed to a divider 92. Divider 92, reduces the value of the width signal in half and produces a half vertical width signal. Whether the output of the switching unit 93 is full or half vertical width signal is determined by the value switching signal F, which is fed to the value switching unit 93. In other words, the switching unit 93 is controlled by the value switching signal F so as to output the half vertical width signal if the picture on the television screen is to be shifted vertically and to output the full vertical width signal if the picture is to be vertically shifted only in one direction. The vertical width signal, thus selected by the value switching unit 93, is fed through a polarity inverter 94 to a vertical address adder 95 where it is added to the read-out vertical address signal. The polarity inverter 94 selectively outputs either the vertical width signal or its complement in accordance with a polarity control signal I supplied from a value comparator 96.

The polarity control signal I is formed in the following manner. Key signal C and the read-out vertical address signal are fed to the key signal central value calculator 97. Calculator 97 calculates the central value of the key signal in units of the value of the horizontal scan period, for each period of the vertical scan, with reference to a predetermined point in the vertical scan period. The vertical central value signal is fed to the value comparator 96, to which is also applied the read-out vertical address signal. The comparator 96 produces the polarity control signal I each time the value of the vertical address signal coincides with that of the vertical control value signal.

As long as no polarity control signal I is fed to the polarity inverter 94, and the vertical width signal is passed therethrough intact, a picture is displayed, shifted upward, on the television screen. In contrast, when polarity control signal I is fed to the polarity inverter 94, and the inverted vertical width signal output therefrom is added with the vertical address signal, a picture is displayed, shifted downward, on the television screen. In this manner the picture is displayed in portions on the television screen, the portions being shifted vertically in opposite directions from the center of the vertical key signal.

It is noted that similar effects can be expected, in the case of the horizontal address controller 80 except, of course, for the scanning direction.

In the above embodiment, the switchers 88 and 98 are provided for inhibiting the added address signals for the periods of the key signals. However, these switchers 88 and 89 may be dispensed with and in such a modification, with the switcher 88 omitted, the output signal D from the special effects device 16, includes a signal portion as shown in dotted lines in FIG. 4(1) or 4(3). The dotted signal portion may be cancelled through use of the mixing keyer amplifier 18.

Although one embodiment of the present invention has been described in which address control is effected on the read-out side, it will be apparent to those skilled in the art that the same results can also be obtained by controlling the write-in address. In addition it will be understood that various other modifications may be made without departing from the spirit of this invention.

What is claimed is:

1. A special effects system for a television signal, said television signal including horizontal and vertical synchronizing signals, said system comprising:
    memory means responsive to a write-in address signal for storing said television signal;
    means responsive to said horizontal and vertical synchronizing signals for producing said write-in address signal;
    means for producing a read-out address signal, the stored television signal being read out in response to said readout address signal;
    means responsive to a control signal for controlling at least one of said write-in and read-out address signals, said controlling means including means responsive to said control signal for producing a full control width signal representing the width of said control signal, means responsive to said full control width signal for producing a half control width signal representing a half of the width of said control signal, and means for adding said half control width signal to at least one of said address signals.

2. A special effects system in accordance with claim 1, wherein said address signals include both horizontal and vertical address signals and means associated with said horizontal address signals for calculating the width of a horizontal control signal and associated with said vertical address signals for calculating the width of a vertical control signal.

3. A special effects system in accordance with claim 2, wherein said calculating means includes means for reducing the width of said horizontal and vertical control signals from a full width to a half width.

4. A special effects system in accordance with claim 3 further including means responsive to the full width horizontal control signal for shifting laterally on a television screen a displayed television picture and responsive to the half width horizontal control signal for splitting into portions the displayed television picture and for shifting the portions right and left, respectively from each other, on the television screen.

5. A special effects system in accordance with claim 4, further including means responsive to the full width vertical control signal for shifting vertically, on the television screen, a displayed television picture and responsive to the half width vertical control signal for splitting into portions the displayed television picture and for shifting the portions, up and down respectively from each other, on the television screen.

6. A special effects system in accordance with claim 1, wherein said controlling means further includes means responsive to said control signal for detecting a midpoint in time of said control signal in each scanning period, and means responsive to said detecting means for inverting said half control width signal in value to produce an inverted half control width signal complementary to said half control width signal, whereby said inverted half control width signal is added to at least one of said address signals after the detection of said midpoint.

7. A special effects system in accordance with claim 6 wherein said detecting means includes means for calculating a midpoint value of said control signal in reference to a predetermined point in the scanning period, and means for comparing said midpoint value with at least one of said address signals to produce a midpoint pulse when said address signals are coincident with said midpoint value.

8. A special effects system in accordance with claim 6, wherein said controlling means further includes means for selectively applying said full and half control width signals to said inverting means.

9. A special effects system in accordance with claim 6, wherein said controlling means further includes means for inhibiting the supply of the output of said adding means to said memory means in response to said control signal.

10. A special effects system in accordance with claims 7, 8 or 9 wherein said address signal comprises both horizontal and vertical address signals, said control signal comprises horizontal and vertical signal components, and said controlling means includes horizontal controlling means and vertical controlling means responsive to said horizontal and vertical signal components, respectively.

11. A special effects system for a television signal displayed on a television screen, the system comprising,
memory means for storing an input video signal,
means for producing a write-in address signal and a read-out address signal, said write-in address signal specifying a location in the memory means to store the video signal and said read-out address signal specifying a location in the memory means from which to read-out the stored video signal,
means responsive to an external control signal for controlling at least one of said address signals, said controlling means including means responsive to said control signal for producing a full control width signal representing the width of said control signal, means responsive to said full control width signal for producing a half control width signal representing a half of the width of said control signal, and
means responsive to said controlling means for adding said half control width signal to at least one of said address signals for dividing into signal portions the signal read-out from said memory means and for displaying said portions on said television screen shifted apart from each other.

* * * * *

UNITED STATES PATENT AND TRADEMARK OFFICE
CERTIFICATE OF CORRECTION

PATENT NO. : 4,178,613
DATED : December 11, 1979
INVENTOR(S) : Ryosuke Takahashi et al.

It is certified that error appears in the above—identified patent and that said Letters Patent is hereby corrected as shown below:

On the cover sheet (Item 73) Assignee should read:

-- Nippon Electric Co., Ltd ., and Tokoyo Broadcasting System Inc. ---.

Signed and Sealed this

Fifth Day of August 1980

[SEAL]

Attest:

SIDNEY A. DIAMOND

Attesting Officer

Commissioner of Patents and Trademarks